S. Hutchinson.
Propagating Trees and Shrubs.
No. 90,548. Patented May 25, 1869.
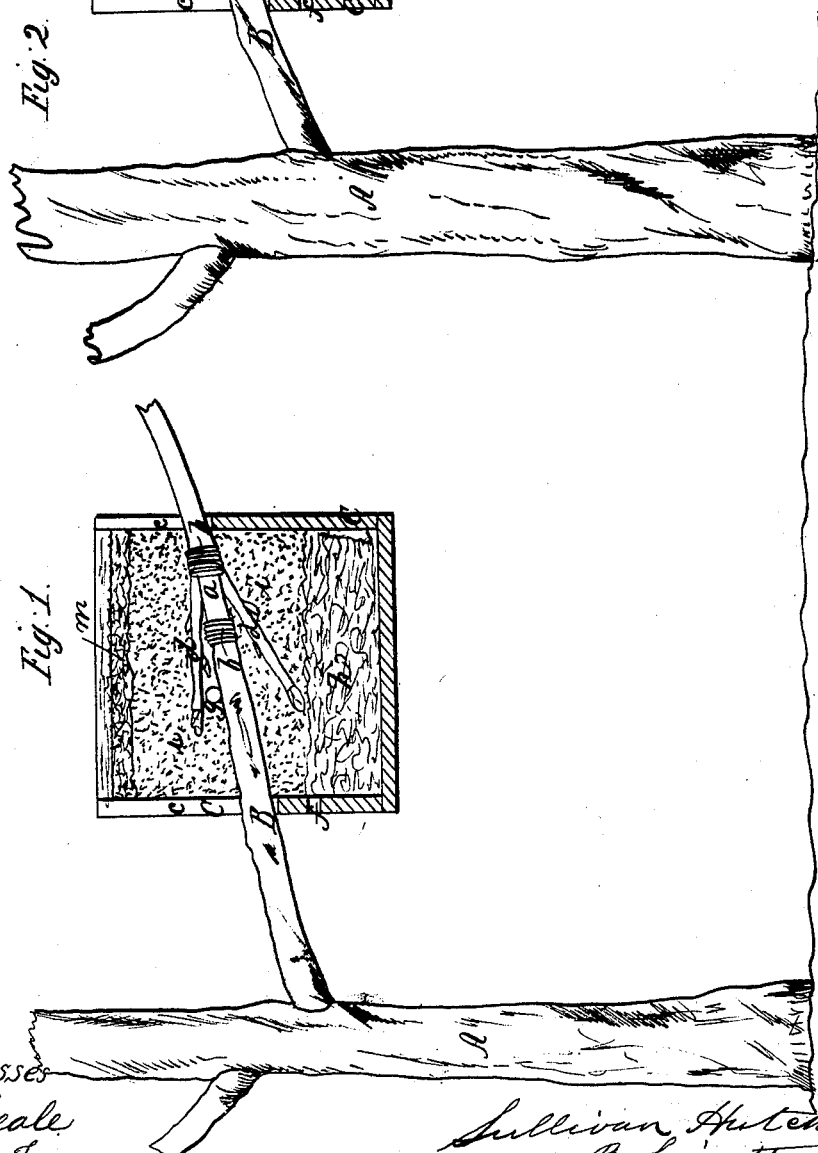

United States Patent Office.

SULLIVAN HUTCHINSON, OF BRISTOL, NEW HAMPSHIRE.

Letters Patent No. 90,548, dated May 25, 1869.

IMPROVEMENT IN PROPAGATING TREES AND SHRUBS.

The Schedule referred to in these Letters Patent and making part of the same.

*To all whom it may concern:*

Be it known that I, SULLIVAN HUTCHINSON, of Bristol, in the county of Grafton, and State of New Hampshire, have invented an Improved Method of Propagating Trees and Shrubs; and I do hereby declare that the following is a full and exact description thereof, reference being had to the accompanying drawings, making part of this specification, Figure 1 representing a limb of a tree, as first treated by my method.

Figure 2, a corresponding view, showing the limb after the roots have formed, ready for planting out.

Figure 3, a view, indicating a modification of the method, as applied to small limbs.

Figure 4, the method as in fig. 3, but ground-layered.

Figure 5, view of an improved watering-vessel, useful in conducting the propagation.

Like letters designate corresponding parts in all of the figures.

By the old, or Chinese mode of layering, a ring of bark is taken from the limb, or the bark is otherwise wounded, so as to prevent the descent of the returning sap below that point, and then surrounding the wounded part with a pot, or box, filled with earth, so that the interruption of the sap-circulation will develop buds, which form roots in the earth, kept moist for that purpose.

This process, though finally successful, is comparatively slow, requiring a whole season, and often two seasons, for producing sufficient roots to sustain the branch independently, when separated from the parent tree, and planted out.

My improved method enables me to produce from a limb, a strong and vigorous tree in the course of a few months, and this with never-failing certainty. And more than this, I am enabled to transform a limb of almost any size, and from a tree in full bearing, in one year, into a complete and vigorous tree, ready itself to bear fruit.

I select a limb, B, fig. 1, of good size, say, an inch or two, in diameter, and, at a short distance from the parent tree A, ring a portion, *a*, an inch or two in length, as usual.

But then I split the terminal bark above the girdled portion *a*, and under it insert a number of scions, *d d*, either of a root or branch, in the ordinary way of inserting scions under the bark, but so as to project downward, as shown.

The scions may be from the same tree, or from any other tree of the same, or nearly-related genus, since they have no influence on the fruit of the tree to be produced.

The number of the scions may be more or less, generally greater, as the limb is larger, so as to insure a sufficiency of roots in the required time.

They are protected by wax, as usual, and the bark, both around the scions and below the girdled part, for about two inches in length, is wound with woollen yarn, *b b*, or with some other substance that will soon decay, and not resist the growth of the branch.

A suitable box, C, is then provided, of sufficient size to contain the roots which will be expected to grow from the scions during the following season.

Two slots, or notches, *c c*, are cut down in opposite sides of the box, so as to admit the limb B into a middle position therein, in which it is arranged so as to enclose the scions in the proper position to allow them to grow, and occupy the box with the least constraint.

The box may be held suspended, by passing a rod, or pin, *g*, through two sides, over the limb, as indicated.

The box is filled with good earth, or, first, within an inch or two of the limb, with earth, or leaf-mould *h*, and then filled up with sand *i*, or other substance that will retain heat, and not too much moisture, around the limb. The whole may be covered with a layer of moss, turf, or other substance, to prevent too rapid evaporation of the moisture.

The earth is to be kept moderately watered; and in order that too much water may not stand in the box, a hole, or holes, *j*, are made in the side thereof, an inch or two below the limb, to drain off superfluous water, as in rainy weather.

A pot, or other equivalent, may be used instead of the box C, which generally, however, is more to be depended on.

The branch is thus treated early in the spring, or when the bark will slip. The box is kept on through the summer; but early in September the branch may be sawed, or cut off from the tree, when the box will be found well filled with vigorous roots produced from the scions. The new tree may then be planted in the ground, the box being removed; or, if it is not desired to save the box, it may be bored with numerous holes, to allow the roots to grow out, and be buried on the tree.

A box may be put together that it can be taken apart, to allow the roots and surrounding soil to be buried, without disturbing them, and the box again be put together for future use.

Care should be taken to tie the tree to a stake, or otherwise support it against strong winds.

Where the limb is sufficiently low, it may be layered in the ground, by pegging down, and burying the part around the scions; but for limbs of large size, as here contemplated, they are not often low enough to accomplish this conveniently and advantageously.

In thus propagating trees, it is, of course, desirable to make good selections of parent trees, such as, for fruit trees, choosing annual bearers, and the new trees will not fail to possess like qualities and habits.

And it may be reckoned one of the peculiar advantages of this method, that a fruit-bearing limb will remain fruit-bearing, and accordingly produce a tree of like character.

Another important advantage derived from the method is, that several years' time are gained in bringing the young tree to bearing, since a limb in full bearing may thus be made into a tree, and its productiveness be scarcely interrupted. It is not too much to say, that often as many as six years may thus be gained over the other modes of propagating.

To these important advantages, it may be added that the trees thus propagated, are always perfectly sound, equal, in this respect, to a seedling, not having the disadvantage of any wounded part, such as grafted trees have at the insertion of the grafts. Besides, trees of extraordinary vigor are produced thereby, since the very large quantity of roots grown in the box is unequalled by even the natural growth of roots in the ground.

Finally, a peculiar advantage, especially in propagating pear and apple trees, may be gained, in uniting the qualities of dwarf and standard trees, by using dwarf scions on standard limbs, and *vice versa;* or by inserting scions both of dwarf and standards in the same limb.

For watering the box A moderately and uniformly, my improved watering-can, or funnel, D, fig. 5, is very convenient and useful. It has a long spout, which can be inserted into the earth, the said spout terminating with notches $l$, which allow the water to flow slowly out, when it rests on a support.

By this means, the water can be introduced at the bottom of the box, without drenching the limb, and sufficient moisture will rise from the bottom by capillary action.

What I claim as my invention, and desire to secure by Letters Patent, is—

The grafting of roots, or root-producing scions $d\ d$, into limbs B B, previous to surrounding them with earth, for propagating trees and shrubs, substantially as and for the purposes herein specified.

The above specification of my invention signed by me, this 13th day of November, 1868.

SULLIVAN HUTCHINSON.

Witnesses:
LEWIS W. FLING,
CURTIS BROWN.